United States Patent
Zhao et al.

(10) Patent No.: US 12,392,956 B2
(45) Date of Patent: Aug. 19, 2025

(54) BACKLIGHT MODULE INCLUDING DAMPENING ASSEMBLY, SENSOR, AND CONTROLLER AND DISPLAY DEVICE INCLUDING THE SAME

(71) Applicant: HKC CORPORATION LIMITED, Guangdong (CN)

(72) Inventors: Junyi Zhao, Guangdong (CN); Junfeng Xie, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/807,937

(22) Filed: Aug. 17, 2024

(65) Prior Publication Data

US 2025/0076567 A1   Mar. 6, 2025

(30) Foreign Application Priority Data

Aug. 29, 2023  (CN) .......................... 202311092555.9

(51) Int. Cl.
*F21V 8/00* (2006.01)
*G02F 1/1335* (2006.01)

(52) U.S. Cl.
CPC ..... *G02B 6/0088* (2013.01); *G02F 1/133524* (2013.01)

(58) Field of Classification Search
CPC .......................... G02B 6/0088; G02F 1/133524
See application file for complete search history.

(56) References Cited

U.S. PATENT DOCUMENTS

| | | | | |
|---|---|---|---|---|
| 10,816,717 | B2 * | 10/2020 | Li ......................... | G02B 6/0081 |
| 2013/0043607 | A1 * | 2/2013 | Yu ......................... | G02B 6/0076 |
| | | | | 264/1.27 |
| 2016/0299287 | A1 * | 10/2016 | Li .......................... | G02B 6/005 |
| 2018/0113252 | A1 * | 4/2018 | Lee ......................... | G02B 6/00 |

FOREIGN PATENT DOCUMENTS

| | | | |
|---|---|---|---|
| CN | 202757022 U | | 2/2013 |
| CN | 104696829 A | | 6/2015 |
| CN | 210864103 U | * | 6/2020 |
| CN | 216118308 U | | 3/2022 |
| CN | 116466427 A | | 7/2023 |
| JP | 2012146504 A | | 8/2012 |
| WO | 2017166503 A1 | | 10/2017 |
| WO | 2023137632 A1 | | 7/2023 |

* cited by examiner

*Primary Examiner* — Keith G. Delahoussaye

(57) ABSTRACT

A backlight module and a display device. The backlight module includes: a back plate, a light guide plate, a damping assembly and a controller. Two ends of the damping assembly are abutted between an inner side wall of the back plate and an outer side wall of the light guide plate; one end of the damping assembly is provided with a pressure sensor, and the controller is respectively electrically connected with the pressure sensor and the damping assembly, and is configured to control a magnitude of a damping force of the damping assembly according to pressure data detected by the pressure sensor. The technical solutions provided in the present application may improve a reliability of position limitation of the light guide plate.

18 Claims, 4 Drawing Sheets

BACKLIGHT MODULE INCLUDING DAMPENING ASSEMBLY, SENSOR, AND CONTROLLER AND DISPLAY DEVICE INCLUDING THE SAME

CROSS-REFERENCE TO RELATED APPLICATION

This application claims priority to Chinese patent application No. 202311092555.9, filed on Aug. 29, 2023, and entitled "backlight module and display device", the entire contents each of which is incorporated herein by reference.

TECHNICAL FIELD

The present application relates to the field of display technologies, and more particularly, to a backlight module and a display device.

BACKGROUND

A backlight module is an important component of a liquid crystal display (Liquid Crystal Display, LCD) device, and the function of the backlight module is to provide uniformly distributed backlight for the display panel, to enable the display panel to be normally displayed. A light bar of the backlight module is usually arranged on an inner side wall of the back plate, and a light guide plate is provided to guide a light scattering direction so as to convert line source into uniform area light source.

In the related art, aiming at fixation of the light guide plate, a rubber block is usually arranged between the light guide plate and the back plate to limit the position of the light guide plate, thereby ensuring that the light guide plate can normally guide light.

However, since the light guide plate is prone to be expanded in high-temperature and high-humidity environment, when the light guide plate is expanded, the rubber block arranged between the back plate and the light guide plate may be extruded by the light guide plate, and the rubber block is enabled to generate a certain amount of compression. Then, arc-shaped bulges are formed on two ends of the rubber block, and the rubber block is caused to deviate upwards and is even fallen off, and thus a reliability of position limitation of the light guide plate is affected.

SUMMARY

In view of above, the present application provides a backlight module and a display device, which are directed at improving the reliability of position limitation of the light guide plate.

In order to achieve the aforesaid objective, in the first aspect, a backlight module is provided in the embodiments of the present application. The backlight module includes: a back plate, a light guide plate, one or a plurality of damping assembly/assemblies and a controller, two ends of the damping assembly are abutted between an inner side wall of the back plate and an outer side wall of the light guide plate;

one end of the damping assembly is provided with a pressure sensor, and the controller is respectively electrically connected with the pressure sensor and the damping assembly, and is configured to control a magnitude of a damping force of the damping assembly according to pressure data detected by the pressure sensor.

In one possible implementation method in the first aspect, the pressure sensor is arranged between the damping assembly and the light guide plate.

In one possible implementation method in the first aspect, the damping assembly includes a piston rod, a cylinder block, and one or a plurality of elastic member(s) and a piston located in the cylinder block;

one end of the piston rod is connected with a first end face of the piston, and the other end of the piston rod extends out of one end of the cylinder block and is connected with the pressure sensor;

the elastic member is connected between the cylinder block and the first end face of the piston;

the controller is electrically connected with the piston, and is configured to control a magnitude of a motion resistance of the piston so as to control the magnitude of the damping force of the damping assembly.

In one possible implementation method in the first aspect, the piston rod is connected to the pressure sensor through a push head, and a cross-sectional area of the push head is greater than a cross-sectional area of the piston rod.

In one possible implementation method in the first aspect, a plurality of through holes are formed in the piston, the plurality of through holes penetrate through the piston and a direction of each of the plurality of through holes is the same as a movement direction of the piston rod;

the controller is specifically configured to control opening and closing of each of the plurality of through holes according to the pressure data.

In one possible implementation method in the first aspect, a damping fluid is enclosed in the cylinder block.

In one possible implementation method in the first aspect, the plurality of elastic members are arranged around the piston rod.

In one possible implementation method in the first aspect, the plurality of damping assemblies are arranged around the light guide plate.

In one possible implementation method in the first aspect, the damping assembly is provided on the light guide plate, and the damping assembly is arranged at least between two ends of two outer side walls of the light guide plate adjacent to a light incident side and the back plate.

In the second aspect, a display device is provided in the embodiments of the present application, the display device includes a display panel and any backlight module in the first aspect.

According to the backlight module and the display device provided in the embodiments of the present application, the damping assembly abuts against the outer side wall of the light guide plate and the inner side wall of the back plate, and the pressure sensor is arranged at one end of the damping assembly, in order to detect the pressure of the light guide plate on the damping assembly. Due to this arrangement, the controller is enabled to control the magnitude of the damping force of the damping assembly according to the pressure data detected by the pressure sensor, and the reliability of position limitation of the light guide plate is improved accordingly.

DETAILED DESCRIPTION OF EMBODIMENTS

The embodiments of the present application are described below with reference to the accompanying drawings. The terms used in the embodiments of the present application are only intended to illustrate the embodiments of the present application, rather than limiting the present application. The following embodiments may be combined with each other, and similar concepts or processes may not be repeatedly described in some embodiments.

Figure 1:
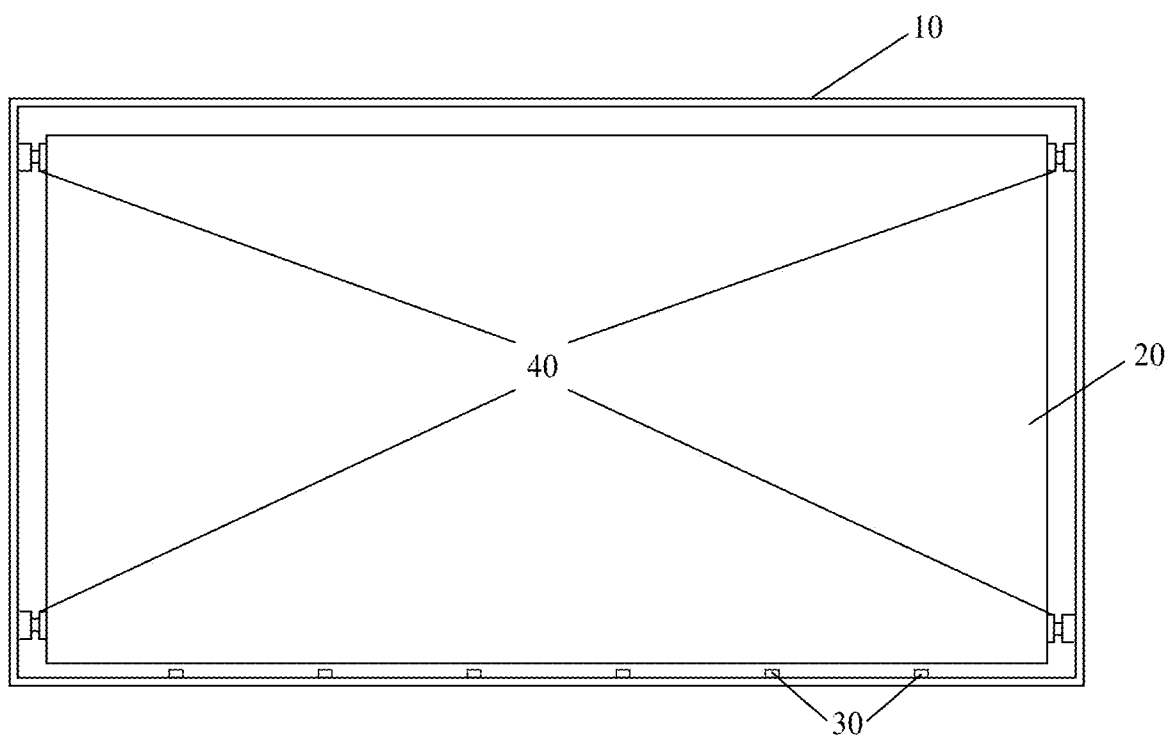
FIG. 1 is a schematic structural diagram of a backlight module according to one embodiment of the present application.

FIG. 1 is a schematic structural diagram of a backlight module according to one embodiment of the present application. As shown in FIG. 1, the backlight module includes a back plate 10 and a light guide plate 20, where a light bar 30 is arranged on an inner side wall of the back plate 10, and a light-exiting surface of the light bar 30 is opposite to a side wall of the light guide plate 20. In this way, light emitted by the light bar 30 is converted from line source to an area light source that can provide uniform backlight for the display panel, after it is conducted and diffused by the light guide plate 20.

In order to improve the reliability of position limitation of the light guide plate 20, the backlight module provided in the present application may further include one or more damping assemblies 40, and each damping assembly 40 may be disposed between an outer side wall of the light guide plate 20 and an inner side wall of the back plate 10, in order to limit the position of the light guide plate 20.

In the present application, the present application is illustratively described by taken a plurality of damping assemblies 40 as an example, each damping assembly 40 is arranged on the light guide plate, and the damping assembly 40 is arranged at least between two ends of two outer side walls of the light guide plate 20 adjacent to a light incident side and the back plate. Illustratively, in some embodiments, the plurality of damping assemblies 40 may also be arranged around the light guide plate 20. In some other embodiments, the backlight module may be provided with a damping assembly 40 between two ends of the outer side wall (i.e., a non-light incident side of the light guide plate 20) of the light guide plate 20 excluding the light incident side, and the inner side wall of the back plate 10. Thus, both space occupation of the damping assembly 40 on the light bar 30 and light shielding of the damping assembly 40 can be reduced, the light incident amount of the light guide plate 20 is increased accordingly, and the dark area is reduced.

Considering that when the damping assembly 40 is arranged on the opposite side (which may also be referred to as an antenna side) of the light incident side of the light guide plate 20, a problem of lamp collision may occur. As shown in FIG. 1, the damping assembly 40 may also be arranged on the other two outer side walls of the light guide plate 20 excluding the light incident side and the antenna side of the light guide plate 20, so as to reduce the probability of occurrence of lamp collision and prolong the service life of the backlight module. The number and the position of the damping assembly/assemblies 40 may be selected according to the actual requirement such as the size of the light guide plate 20, which is not particularly limited in the present application.

Two ends of the damping assembly 40 may be abutted between the inner side wall of the back plate 10 and the outer side wall of the light guide plate 20. Due to this arrangement, when the light guide plate 20 is expanded or shrinks, the damping assembly 40 may provide a corresponding damping force to the light guide plate 20 according to a degree of expansion of the light guide plate 20.

In some embodiments, one end of the damping assembly 40 may be fixed to the inner side wall of the back plate 10 by gluing, bolting, etc., thereby improving the reliability of position limitation of the light guide plate 20 through the damping assembly 40. In some other embodiments, the two ends of the damping assembly 40 may also be fixed on the inner side walls of the light guide plate 20 and the back plate 10.

Figure 4:
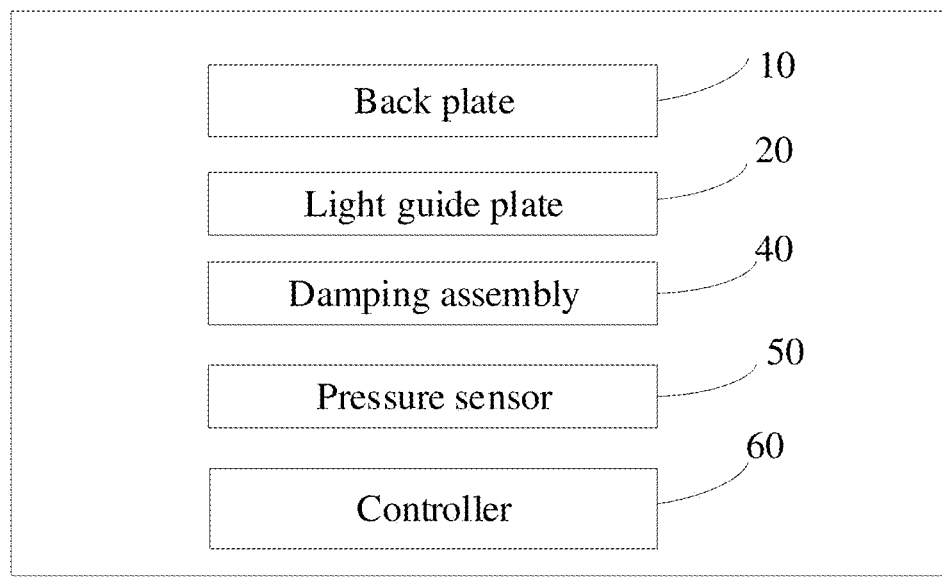
FIG. 4 is a schematic block diagram of the backlight module according to one embodiment of the present application.

In order to improve the accuracy of the damping force provided by the damping assembly 40, as shown in FIG. 4, the backlight module may further include a pressure sensor and a controller 60.

Figure 2:
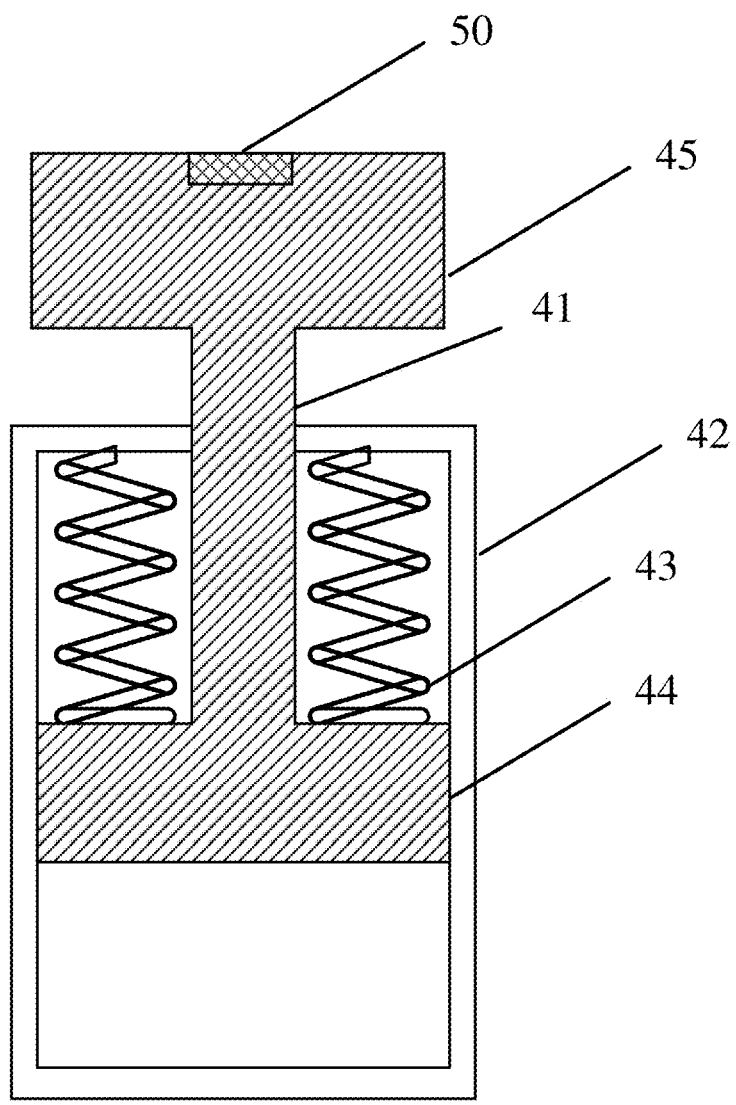
FIG. 2 is a schematic structural diagram of a damping assembly according to one embodiment of the present application.

FIG. 2 is a schematic structural diagram of a damping assembly 40 according to one embodiment of the present application. As shown in FIG. 2, the pressure sensor 50 may be arranged at one end of the damping assembly 40 and is configured to detect a pressure exerted on the damping assembly 40. Specifically, the pressure sensor 50 may be fixed at one end of the damping assembly 40 abutting against the light guide plate 20. In some other embodiments, the pressure sensor 50 may also be fixed to a position of the light guide plate 20 that abuts against the damping assembly 40.

It may be understood that, in some embodiments, the pressure sensor 50 may also be fixed between the damping assembly 40 and the inner side wall of the back plate 10. For example, the pressure sensor 50 may be fixed at one end of the damping assembly 40 abutting against the inner side wall of the back plate 10.

For the convenience of description, the present application is described by taking the pressure sensor 50 arranged at one end of the damping assembly 40 abutting against the light guide plate 20 as an example.

The controller 60 may be electrically connected to the pressure sensor 50 and the damping assembly 40 respectively, and is configured to control the magnitude of the damping force of the damping assembly 40 according to the pressure data detected by the pressure sensor 50. The controller 60 may obtain the pressure data detected by the pressure sensor 50 in real time so as to adjust the damping force of the damping assembly 40 in real time. Alternatively, the controller 60 may also periodically obtain the pressure data detected by the pressure sensor 50 so as to reduce power consumption.

Referring to FIG. 2, the damping assembly 40 may include a piston rod 41, a cylinder block 42, an elastic member 43 and a piston 44 located in the cylinder block 42. Where the piston rod 41 is a connecting piece that supports the piston 44 to work, one end of the piston rod 41 is connected to a first end surface of the piston 44, and the other end of the piston rod 41 extends from one end of the cylinder block 42 and is connected to the pressure sensor 50. The piston rod 41 may be made of metal, or the like. In some embodiments, the piston rod 41 may also be a hard composite material, thereby improving lightweight and corrosion resistance of the damping assembly 40.

The piston 44 may divide a chamber of the cylinder block 42 into a first working chamber and a second working chamber. The elastic member 43 may be deformed under the pressure between the light guide plate 20 and the damping assembly 40 and restore to its original shape after the pressure is removed. For example, when the piston 44 moves towards the bottom of the cylinder block 42, the elastic member 43 is stretched to generate a pulling force applied on the piston 44. The elastic member 43 may be located in the first working chamber and is connected between the cylinder block 42 and the first end surface of the piston 44. A plurality of elastic members 43 may be provided, and the plurality of elastic members 43 may be arranged around the piston rod 41 to improve the reliability of the damping assembly 40. Specifically, the elastic member(s) 43 may be spring(s).

The damping assembly 40 may further include a push head 45, the piston rod 41 may be connected to the pressure sensor 50 through the push head 45, and a cross-sectional area of the push head 45 is greater than a cross-sectional area of the piston rod 41. The reliability of position limitation on the light guide plate 20 through the damping assembly 40 may be improved by increasing a contact area between the damping assembly 40 and the light guide plate 20. In some embodiments, the pressure sensor 50 may be arranged on an abutting surface of the damping assembly 40 and the light guide plate 20. In some other embodiments, the pressure sensor 50 may also be arranged to be embedded in the push head 45, so as to improve the stability of the pressure sensor 50. Moreover, the pressure sensor 50 is embedded in the push head 45, such that the pressure applied on the push head 45 may be better detected, and the accuracy of the pressure data is improved accordingly. The push head 45 may be connected to the piston rod 41 by gluing, welding, etc. In some embodiments, the push head 45 and the piston rod 41 may be integrally formed, due to this arrangement, reduction of assembly cost and structural complexity of the damping assembly 40 is facilitated.

The controller 60 may be electrically connected with the piston 44 in the cylinder block 42, and is configured to control a magnitude of a motion resistance of the piston 44, thereby controlling a magnitude of a damping force of the damping assembly 40. The controller 60 may be arranged outside or inside the damping assembly 40. For example, the controller 60 may be arranged on an inner side wall of the backplate 10 and is electrically connected to the pressure sensor 50 and the piston 44 through a connecting wire (not shown) passing through the piston rod 41. The controller 60 may be configured as one single controller 60 for controlling magnitudes of damping forces of the plurality of damping assemblies 40. As an alternative, the controller 60 may be configured as multiple controllers 60 for controlling the magnitudes of the damping forces of the plurality of damping assemblies 40, respectively. The configured location and the number of the controller 60 are not particularly limited in the present application. The motion resistance of the piston 44 refers to various forces that hinder the movement of the piston 44 in the damping assembly 40, such as the friction force between the piston 44 and the inner side wall of the cylinder block 42, the pulling force on the piston 44 when the elastic member 43 is stretched, etc. The numerical value of the motion resistance of the piston 44 may be obtained by using a method such as resistance sensor detection, empirical formula calculation, and the like, which is not particularly limited in the present application.

In a possible implementation method, the controller 60 compares the pressure detected by the pressure sensor 50 with a pressure threshold value, and determines that the light guide plate 20 is expanded when the pressure data is greater than the pressure threshold value. When the light guide plate 20 is expanded, the controller 60 may adjust a fitting degree between the side surface of the piston 44 and the inner wall of the cylinder block 42 according to the pressure of the light guide plate 20 applied on the damping assembly 40. Thus, the magnitude of the motion resistance of the piston 44 in the cylinder block 42 may be controlled.

In some embodiments, how the controller 60 controls the motion resistance of the piston 44 may be implemented according to the method described below:

The piston may include an elastic insulating layer, a first electrode layer, a second electrode layer, and an electroactive polymer disposed between the first electrode layer and the second electrode layer. The electroactive polymer (Electroactive Polymer, EAP) is a new type of flexible functional material that can expand or shrink by changing the internal structure thereof under the change of external electric field. The elastic insulating layer may be configured to enclose the first electrode layer, the second electrode layer, and the electroactive polymer. An outer surface of the elastic insulating layer is provided with a wear-resistant layer.

For example, the light guide plate 20 is heated to expand and then is cooled to shrink and return to its original shape, when the light guide plate 20 is expanded, pressure will be applied on the push head 45 so as to drive the piston rod 41 to push the piston 44 to move towards the bottom of the cylinder block 42, thereby compressing air in the second working chamber. In this condition, the elastic member 43 is in a stretched state. When the controller 60 detects that the pressure data is less than the motion resistance of the piston 44, the electric field between the first electrode layer and the second electrode layer is changed, such that the electroactive polymer shrinks, the gap between the piston 44 and the inner wall of the cylinder block 42 is increased, and the air in the second working chamber may flow into the first working chamber through the gap, thereby reducing the motion resistance of the piston 44.

When the controller 60 detects that the pressure data detected by the pressure sensor 50 is lower than the pressure threshold value, the controller 60 determines that the light guide plate 20 shrinks. In this condition, the piston 44 moves towards the top of the cylinder block 42 under the action of the pulling force of the elastic member 43. When the pulling force is less than the motion resistance, the controller 60 causes the electroactive polymer to shrink by changing the electric field according to a comparison result between the pulling force of the elastic member 43 and the motion resistance of the piston 44, such that the gap between the piston 44 and the inner wall of the cylinder block 42 is increased, and the motion resistance of the piston 44 is reduced. Thus, the elastic member 43 can pull the piston 44 back, and the push head 45 moves accordingly, such that the damping assembly 40 can continuously provide position limitation function for the light guide plate 20.

The controller 60 controls the electroactive polymer to expand or shrink, so as to control the degree of change of the gap between the piston 44 and the inner wall of the cylinder block 42 according to the actual requirement, which is not particularly limited in the present application.

Figure 3:
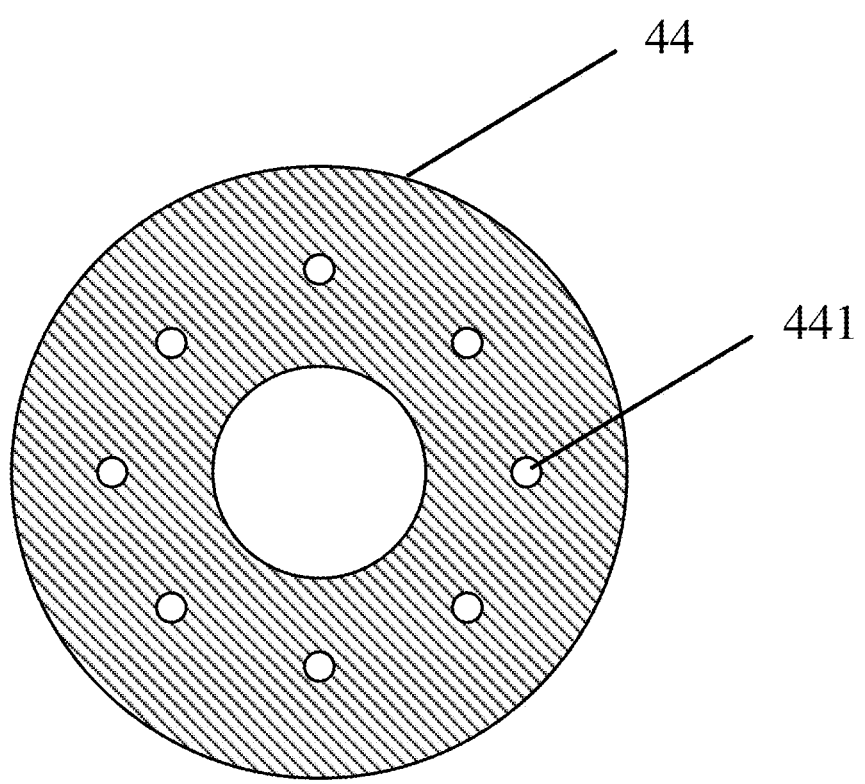
FIG. 3 is a top view of a piston structure according to one embodiment of the present application.

FIG. 3 is a top view of a piston structure according to one embodiment of the present application. As shown in FIG. 3, in some other embodiments, the controller 60 may further control the motion resistance of the piston 44 by forming through hole(s) 441 penetrating through the piston 44, and the direction of the through hole(s) 441 is the same as the movement direction of the piston rod 41. One through hole 441 may be provided. In order to better control the magnitude of the motion resistance of the piston 44, a plurality of through holes 441 may be provided. For the convenience of description, the present application is exemplarily described by taking a plurality of through holes 441 as an example. When the light guide plate 20 is expanded, the piston rod 41 pushes the piston 44 to move towards the bottom of the cylinder block 42, and the air in the second working chamber is compressed. When the controller 60 detects that the pressure data is less than the resistance to the piston 44, the controller 60 may control opening and closing of each through hole 441 according to the pressure data, which facilitates the air in the second working chamber to flows to the first working chamber, thereby reducing the motion resistance of the piston 44, and thereby controlling the magnitude of the damping force of the damping assembly 40.

The controller 60 determines that the light guide plate 20 shrinks when detecting that the pressure data detected by the pressure sensor 50 is lower than the pressure threshold value. In this condition, the piston 44 moves towards the top of the cylinder block 42 under the action of the pulling force of the elastic member 43. When the pulling force is less than the motion resistance, the controller 60 controls the piston 44 to open a preset number of through holes 441 according to the comparison result between the pulling force of the elastic member 43 and the motion resistance of the piston 44, such that air in the first working chamber can flow to the second working chamber through the through holes 441, the motion resistance of the piston 44 is reduced, such that the elastic member 43 can reset the push head 45, and the damping assembly 40 can continuously provide the position limitation function for the light guide plate 20.

When the pressure data is less than the motion resistance of the piston 44, the controller 60 controls the piston 44 to open one through hole 441 according to the comparison result between the pulling force of the elastic member 43 and the motion resistance of the piston 44. The controller 60 may also control the quantity of opened through holes and the quantity of closed through holes correspondingly according to a difference value between the pressure data detected when the light guide plate 20 expands or shrinks and the motion resistance of the piston 44, and according to the proportion of the difference value to the motion resistance of the piston 44.

In order to improve the reliability of position limitation of the damping assembly 40, a damping fluid (not shown in the figures) may also be provided in the cylinder block 42. The damping fluid may be oil, thereby providing a lubrication protection effect required for the piston 44 and the inner wall of the cylinder block 42, and prolonging the service life of the piston 44 Exemplarily, when the light guide plate 20 is expanded, the piston rod 41 pushes the piston 44 to move towards the bottom of the cylinder block 42, and the oil in the second working chamber generates resistance to the piston 44 when the piston 44 moves. When the pressure data is less than the resistance to the piston 44, the controller 60 may control the quantity of the opened through holes 441 according to the pressure data, to enable the oil in the second working chamber to flow from the through holes 441 of the piston 44 to the first working chamber, thereby reducing the motion resistance of the piston 44.

When the light guide plate 20 shrinks back to its original shape, the pressure of the light guide plate 20 applied on the damping assembly 40 is reduced. When the controller 60 detects that the pressure data is lower than the pressure threshold value, the controller 60 may control the piston 44 to open at least one through hole 441, in order that the damping assembly 40 can restore the push head 45 to its initial position abutting against the light guide plate 20 under the pulling force generated by the elastic member 43. Correspondingly, the damping fluid flows back to the second working chamber from the first working chamber through the at least one through hole 441.

In some embodiments, the controller 60 may further control the piston 44 to close the preset number of through holes 441 after a condition that the pressure data is continuously less than the pressure threshold value lasts for a preset time.

It should be noted that the structure of the damping assembly 40 in the present application is not limited thereto. For example, in an actual product, a sealing member (e.g., an oil seal ring) may also be provided between an opening of the cylinder block 42 and the piston rod 41, such that the damping liquid can be prevented from flowing out of the gap of the cylinder block 42 from the piston rod 41, and the service life of the damping assembly 40 is prolonged accordingly.

In some embodiments, a reflective film may be arranged on the abutting surface of the damping assembly 40 and the outer side wall of the light guide plate 20, and thus a utilization rate of light is improved.

The backlight module provided in the present application includes the back plate, the light guide plate, the damping assembly 40 and the controller 60, the damping assembly 40 is abutted between the inner side wall of the back plate and the outer side wall of the light guide plate, and one end of the damping assembly 40 is provided with the pressure sensor for detecting the pressure of the light guide plate applied on the damping assembly 40. Due to this arrangement, the controller 60 may control the damping force of the damping assembly 40 according to the pressure data detected by the pressure sensor, thereby improving the reliability of position limitation of the light guide plate.

Based on the same inventive concept, the present application further provides a display device. The display device includes a display panel and the backlight module according to any one of the aforesaid embodiments.

It should be understood that, in the description of the specification and the annexed claims of the present application, terms including "including", "contain", "have", and any variations thereof are intended to cover non-exclusive inclusion and imply "including but not limited to", unless otherwise these terms are specially emphasized in other manner.

In the description of the present application, "/" indicates that there is a "or" relationship between two consecutive associated objects, unless otherwise "/" is specified. For example, A/B may represent A or B. The phrase of "and/or" in the context is used for describing an association relationship of the associated objects, and indicates that three relationships may exist. For example, A and/or B may represent that A exists alone, A and B exist at the same time, and B exists alone. A and B may be singular or plural.

Moreover, in the description of the present application, "plurality of" refers to two or more than two, unless otherwise "plurality of" is particularly specified. "at least one of the following items" or similar expressions refers to any combination of the terms, including any combination of singular term or plural terms.

In addition, in the description of the present application, it needs to be understood that, directions or location relationships indicated by terms such as "longitudinal", "horizontal", "up", "down", "front", "rear", "left", "right", "vertical", "horizontal", "top", "bottom", "inside", "outside", "axial direction", "radial direction", "circumferential direction" and so on are the directions or location relationships shown in the accompanying figures, which are only intended to describe the present application conveniently and simplify the description of the present application, rather than indicating or implying that an indicated device or component must have specific locations or be constructed and manipulated according to specific locations. Thus, these terms shouldn't be interpreted as limitations to the present application.

In the present application, unless there is additional explicit stipulation and limitation, terms such as "connect", "connected" and the like should be generalizedly interpreted. For example, "connect" may be interpreted as mechanically connected or electrically connected; "connect" may also be interpreted as directly connected or indirectly connected through intermediary, or be interpreted as internal communication between two components or an interaction relationship between the two components, unless otherwise "connect" is specifically defined. The person of ordinary skill in the art may interpret the specific meanings of the aforesaid terms in the present application according to specific conditions.

In addition, in the description of the present application and the annexed claims, terms such as "first", "second", and the like are used to distinguish similar objects and do not need to be used for describing a specific order or sequence order, nor can they are interpreted as indicating or implying relative importance or implying the quantity of the indicated technical features. It should be understood that the data used in this way may be interchanged in appropriate condition, such that the embodiments described herein can be implemented in an order other than those illustrated or described herein. A feature limited by "first" or "second" may explicitly or implicitly include at least one such feature.

In the embodiments of the present application, words such as "illustratively" or "for example" are used to indicate examples, examples or explanations. Any embodiment or design scheme described as "exemplary" or "for example" in the present application should not be interpreted as being more preferable or advantageous than other embodiments or design schemes. Specifically, the use of words such as "exemplarily" or "for example" aims at presenting relevant concepts in a concrete manner.

The descriptions of "referring to one embodiment" and "referring to some embodiments", and the like as described in the specification of the present application means that a specific feature, structure, or characters which are described with reference to this embodiment are included in one embodiment or some embodiments of the present application. Thus, phrases of "in one embodiment", "in some embodiments", "in some other embodiments", "in other embodiments", and the like in this specification are not necessarily referring to the same embodiment, but instead indicate "one or more embodiments instead of all embodiments", unless otherwise these phrases are specially emphasized in other manner.

Finally, it should be noted that, the various embodiments mentioned above are only intended to explain the technical solutions of the present application, rather than limiting the technical solutions of the present application. Although the present application has been described in detail with reference to these embodiments, a person of ordinary skilled in the art should understand that, the technical solutions disclosed in the embodiments may also be amended, some technical features in the technical solutions may also be equivalently replaced. The amendments or the equivalent replacements don't cause the essence of the corresponding technical solutions to be deviated from the spirit and the scope of the technical solutions in the embodiments of the present application.

What is claimed is:

1. A backlight module, comprising: a back plate, a light guide plate, one or a plurality of damping assemblies and a controller, wherein two ends of each damping assembly are abutted between an inner side wall of the back plate and an outer side wall of the light guide plate;
    wherein one end of the damping assembly is provided with a pressure sensor, and the controller is respectively electrically connected with the pressure sensor and the damping assembly, and is configured to control a magnitude of a damping force of the damping assembly according to pressure data detected by the pressure sensor.

2. The backlight module according to claim 1, wherein the pressure sensor is arranged between the damping assembly and the light guide plate.

3. The backlight module according to claim 1, wherein the damping assembly comprises a piston rod, a cylinder block, and one or a plurality of elastic member(s) and a piston located in the cylinder block;
    wherein one end of the piston rod is connected with a first end face of the piston, and an other end of the piston rod extends out of one end of the cylinder block and is connected with the pressure sensor;
    each elastic member is connected between the cylinder block and the first end face of the piston; and
    the controller is electrically connected with the piston, and is configured to control a magnitude of a motion resistance of the piston so as to control the magnitude of the damping force of the damping assembly.

4. The backlight module according to claim 3, wherein the piston rod is connected to the pressure sensor through a push head, and a cross-sectional area of the push head is greater than a cross-sectional area of the piston rod.

5. The backlight module according to claim 3, wherein a plurality of through holes are formed in the piston, wherein the plurality of through holes penetrate through the piston and a direction of each of the plurality of through holes is identical to a movement direction of the piston rod;
    the controller is specifically configured to control opening and closing of each of the plurality of through holes according to the pressure data.

6. The backlight module according to claim 3, wherein a damping fluid is enclosed in the cylinder block.

7. The backlight module according to claim 3, wherein the plurality of elastic members are arranged around the piston rod.

8. The backlight module according to claim 1, wherein the plurality of damping assemblies are arranged around the light guide plate.

9. The backlight module according to claim 1, wherein the damping assembly is provided on the light guide plate, the damping assembly is arranged at least between two ends of two outer side walls of the light guide plate adjacent to a light incident side and the back plate.

10. A display device, comprising a display panel and a backlight module, and the backlight module comprising: a back plate, a light guide plate, one or a plurality of damping assemblies and a controller, wherein two ends of each damping assembly are abutted between an inner side wall of the back plate and an outer side wall of the light guide plate;
    wherein one end of the damping assembly is provided with a pressure sensor, and the controller is respectively electrically connected with the pressure sensor and the damping assembly, and is configured to control a magnitude of a damping force of the damping assembly according to pressure data detected by the pressure sensor.

11. The display device according to claim 10, wherein the pressure sensor is arranged between the damping assembly and the light guide plate.

12. The display device according to claim 10, wherein the damping assembly comprises: a piston rod, a cylinder block, and one or a plurality of elastic member(s) and a piston located in the cylinder block;
   wherein one end of the piston rod is connected with a first end face of the piston, and an other end of the piston rod extends out of one end of the cylinder block and is connected with the pressure sensor;
   the elastic member is connected between the cylinder block and the first end face of the piston; and
   the controller is electrically connected with the piston, and is configured to control a magnitude of a motion resistance of the piston so as to control the magnitude of the damping force of the damping assembly.

13. The display device according to claim 12, wherein the piston rod is connected to the pressure sensor through a push head, and a cross-sectional area of the push head is greater than a cross-sectional area of the piston rod.

14. The display device according to claim 12, wherein a plurality of through holes penetrating through the piston are formed in the piston, and a direction of the through holes is identical to a movement direction of the piston rod;
   the controller is specifically configured to control opening and closing of each of the plurality of through holes according to the pressure data.

15. The display device according to claim 12, wherein a damping fluid is enclosed in the cylinder block.

16. The display device according to claim 12, wherein the backlight module comprises a plurality of elastic members which are arranged around the piston rod.

17. The display device according to claim 10, wherein the backlight module comprises a plurality of damping assemblies which are arranged around the light guide plate.

18. The display device according to claim 10, wherein the damping assembly is arranged on the light guide plate, and wherein the damping assembly is arranged at least between two ends of two outer side walls of the light guide plate adjacent to a light incident side and the back plate.

* * * * *